United States Patent [19]
Annic et al.

[11] Patent Number: 5,779,550
[45] Date of Patent: Jul. 14, 1998

[54] TORSION DAMPING DEVICE, NOTABLY FOR MOTOR VEHICLES

[75] Inventors: Pascal Annic, Dinard; Michel Ginaldi, Paris; Gustave Chasseguet, Taverny, all of France

[73] Assignee: Valeo, Paris Cedex, France

[21] Appl. No.: 545,737

[22] PCT Filed: Mar. 1, 1995

[86] PCT No.: PCT/FR95/00239

§ 371 Date: Jan. 22, 1996

§ 102(e) Date: Jan. 22, 1996

[87] PCT Pub. No.: WO95/23929

PCT Pub. Date: Sep. 8, 1995

[30] Foreign Application Priority Data

Mar. 4, 1994 [FR] France .................. 94 02542

[51] Int. Cl.$^6$ .................................................. F16D 3/66
[52] U.S. Cl. .................................. 464/66; 192/212
[58] Field of Search ................. 464/66, 68; 192/205, 192/55.61, 212, 30 V; 74/574

[56] References Cited

U.S. PATENT DOCUMENTS

| | | | |
|---|---|---|---|
| Re. 33,984 | 7/1992 | Spitler ........................... | 464/68 X |
| 893,794 | 7/1908 | Giradot .......................... | 464/66 |
| 1,445,716 | 2/1923 | Robinson et al. . | |
| 1,518,360 | 12/1924 | Royce ............................ | 464/66 X |
| 1,648,110 | 11/1927 | Cartlidge ........................ | 192/55.61 |
| 1,820,749 | 8/1931 | Loeffler .......................... | 464/66 |
| 2,909,911 | 10/1959 | Spaetgens ....................... | 464/66 |
| 3,050,166 | 8/1962 | Cunningham .................... | 192/55.61 X |
| 3,810,533 | 5/1974 | Densow .......................... | 192/55.61 X |
| 4,027,757 | 6/1977 | Radke et al. .................... | 464/68 X |
| 4,139,995 | 2/1979 | Lamarche . | |
| 4,484,898 | 11/1984 | Kohno ............................ | 464/68 X |
| 4,591,348 | 5/1986 | Takeuchi et al. ................ | 192/205 X |
| 5,168,773 | 12/1992 | Janiszewski .................... | 74/574 |

FOREIGN PATENT DOCUMENTS

| | | |
|---|---|---|
| 2518202 | 6/1983 | France . |
| 2620187 | 3/1989 | France . |
| 2692642 | 12/1993 | France . |

Primary Examiner—Daniel P. Stodola
Assistant Examiner—Gregory J. Strimbu
Attorney, Agent, or Firm—Longacre & White

[57] ABSTRACT

A torsion damping device having two coaxial parts (12, 3) mounted so as to move angularly with respect to each other counter to elastic member (7), including members (71, 72, 73) acting between radial lugs (55, 65) offset circumferentially and belonging to two phasing washers (5, 6). The phasing washers (5, 6) are mounted in reverse orientations and concentrically, the outer washer surrounding the inner washer. The inner washer (5) is pivotally mounted on a first one (3) of the coaxial parts (3, 12), while the outer washer (6) is pivotally mounted on the first or the second of the coaxial parts (3, 12).

10 Claims, 5 Drawing Sheets

TORSION DAMPING DEVICE, NOTABLY FOR MOTOR VEHICLES

BACKGROUND OF THE INVENTION

1. Field of the Invention

The present invention concerns torsion damping devices, notably for motor vehicles, of the type having one input part and one output part coupled elastically by means of two phasing washers each mounted freely on one of the parts.

2. Description of the Prior Art

Such a damping device is described, for example, in the document U.S. Pat. No. 4,139,995, and therefore has two coaxial parts mounted so as to move angularly with respect to each other counter to elastic means with circumferential action, comprising elastic members acting between lugs offset circumferentially and belonging to two phasing washers which are the image of each other.

In this document, the input part is formed by a housing in two parts and the output part by a hub fluted on the inside, and the phasing washers are mounted so as to rotate with respect to the two coaxial parts.

More precisely, the phasing washers are pivotally mounted on the hub and each have radial arms for the bearing of elastic members with circumferential action.

These washers are offset circumferentially so that three sets of springs are mounted in series between two consecutive bearings borne by the housing.

One of the sets of springs bears on the bearing of the housing and on a lug of one of the phasing washers, while another one of the sets of springs is interposed circumferentially between the aforementioned phasing lug and a lug of the second phasing washer. Finally, the third set of springs is mounted between the bearing of the housing and the lug of the second phasing washer.

In practice, the shape of these phasing washers is tortuous, since they are mounted on each side of a web, of a single piece with the hub.

The inner periphery of a phasing washer is thus axially offset with respect to its outer periphery.

The object of the present invention is to overcome this drawback and therefore create a torsion damping device with simplified phasing washers.

SUMMARY OF THE INVENTION

According to the invention, a torsion damping device of the aforementioned type is characterised in that the two phasing washers are mounted in the same plane, in reverse orientations and concentrically, one of the washers, referred to as the outer washer, surrounding the other washer, referred to as the inner washer, in that the lugs of the inner washer are directed in a direction opposite to the axis of the assembly, while the lugs of the outer washer are directed towards the axis of the assembly, and in that the inner washer is pivotally mounted on a first one of the said coaxial parts of the torsion damping device, while the outer washer is pivotally mounted on the said first or the said second part of the torsion damping device.

By means of the invention, the phasing washers can be simple in shape. These phasing washers can be manufactured by cutting out on a press, the material for the inner phasing washer being taken from the waste from the outer phasing washer.

In one embodiment, the outer phasing washer is pivotally mounted on the lugs of the inner phasing washer. In another embodiment, the outer phasing washer is pivotally mounted on lugs belonging to the second of the said coaxial parts, the inner phasing washer being pivotally mounted on the said first of the coaxial parts.

In one embodiment, the second of the parts of the torsion damping device has lugs for the bearing of the elastic members in question, the said lugs being cut out for the passage of fingers belonging to the second of the coaxial parts of the torsion damping device.

These fingers are suitable for each acting on a dish interposed between the circumferential end of the spring or springs in question and the lug associated with the second coaxial part of the torsion damping device in question.

By virtue of this arrangement, it is possible to obtain a torsional damper with a large angular movement.

This torsion damping device can belong to a friction disc, as mentioned in the document U.S. Pat. No. 4,139,995. As a variant, this torsion damping device can belong to a locking clutch mounted between the turbine and the housing of a hydrokinetic coupling apparatus.

The description that follows illustrates the invention in relation to the accompanying drawings in which:

DETAILED DESCRIPTION OF THE PREFERRED EMBODIMENT

As illustrated by the figures, the locking clutch 10 using a torsion damping device 4 is intended for equipping a hydrokinetic coupling apparatus 11, including a torque converter or a coupling, which is itself designed to equip a motor vehicle.

Such an apparatus is described in the patent U.S. Pat. No. 4,976,656, to which reference can be made, and this is the reason why, for the sake of simplicity, only the first part of the housing 12 and turbine wheel 14 have been depicted in FIG. 1, the impeller wheel and the reactor wheel not being visible.

Figure 1:
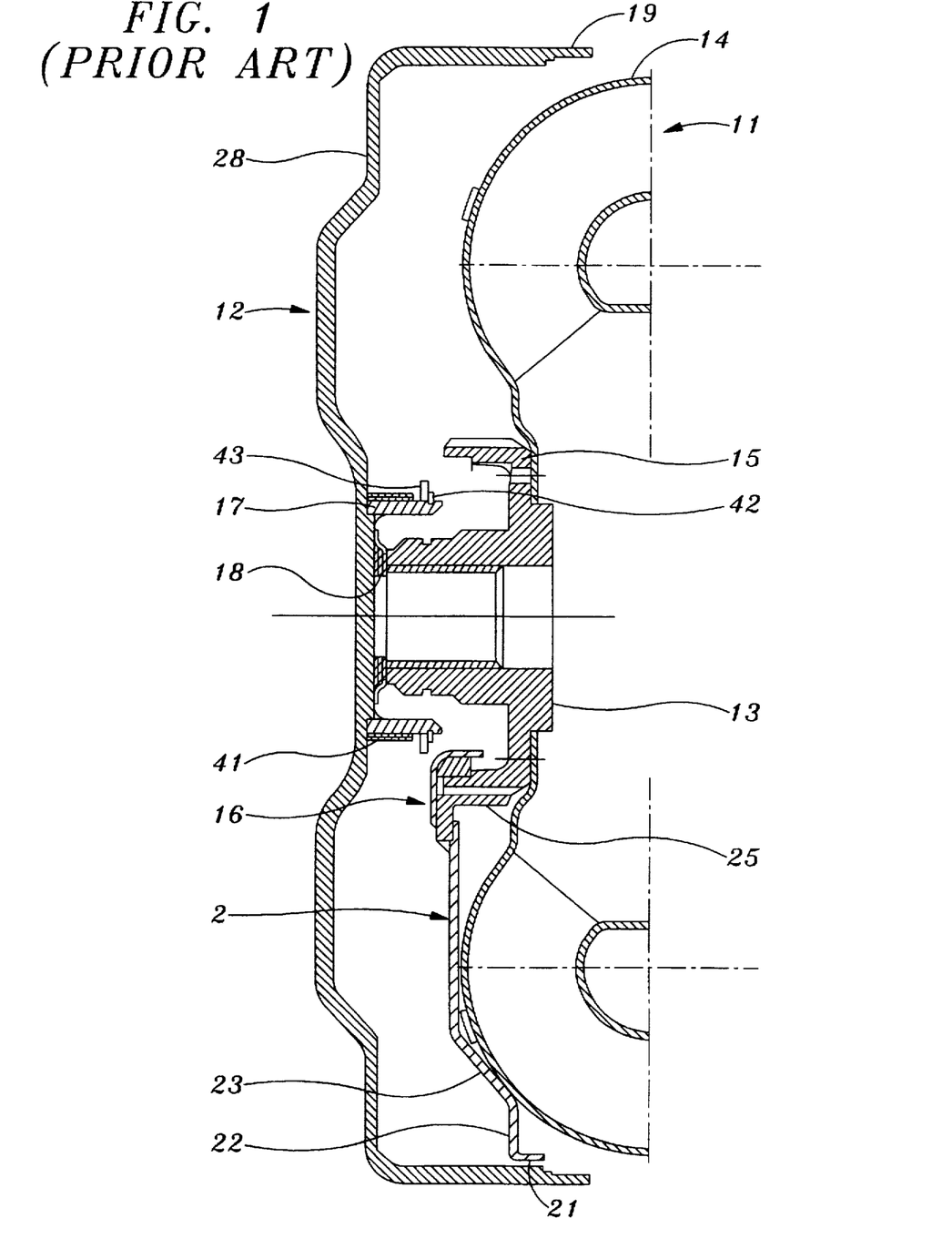
FIG. 1 is a view in axial section of the hydrokinetic coupling apparatus without the locking clutch in the top part of this figure and with only the locking clutch piston in the bottom part of this figure.

For information, it should be stated that this apparatus 11 includes, in a sealed housing 12 capable of being rotatably connected to the crankshaft of the internal combustion engine, at least one impeller wheel fixed to the other part of the housing, in the form of a half-shell, and a turbine wheel 14, which is capable of being rotatably connected to the gearbox input shaft. In this case the apparatus 11 includes, in order to form a torque converter, also a reactor wheel carried by a fixed sleeve surrounding the said input shaft with the interposition of a free wheel.

The locking clutch 10 acts, in a manner known per se, axially between the turbine wheel 14 and housing 12, annular in shape, at the outer periphery of the latter.

It includes a piston 2 capable of coming into contact with a mass 3 in order to establish a direct connection between the turbine wheel 14 and housing 12.

In a manner known per se, the turbine wheel and impeller wheel include blades so that the turbine wheel 14 is rotated by the impeller wheel fixed to the housing 12 by means of the circulation of the oil contained in the housing 12.

The locking clutch 10 acts in a manner known per se after the start-up of the motor vehicle in order to avoid slip phenomena and losses of energy.

The turbine wheel 14 is fixed, in this case by welding or as a variant by riveting, to a turbine hub 13 fluted internally for rotatory connection with the aforesaid input shaft of the gearbox.

This hub 13, in this case metallic, has at its outer periphery an externally fluted annulus 15 of axial orientation.

The piston 2 is in this case fixed by welding, or as a variant by riveting, to an internally fluted bush 25 in order to come into an engagement in a complementary manner with the flutes on the annulus 15.

Thus the housing 12 forms the driving element and the hub 13 the driven element of the hydrokinetic coupling apparatus 11.

The housing 12 is therefore capable of being rotatably locked on the driving shaft (the drive shaft of the vehicle), whilst the turbine wheel 14 is capable of being rotatably locked on a driven shaft (the gearbox input shaft).

The housing 12 also forms the input element of the locking clutch 10 and of the torsion damper 4, whilst the piston 2 forms the output element of the locking clutch 10 whilst being capable of being coupled to the hub 13.

The piston 2, of transverse orientation overall, is thus, as described previously, rotatably connected to the turbine wheel 14 (in this case via the hub 13), whilst being mounted so as to be axially mobile vis-a-vis the turbine wheel 14.

A sealing device 16 is located between the front face of the bush 25 and the internal bore of the annulus 15. This device includes an annular part with an L-shaped cross section welded on the one hand to the transverse plate, which the bush 25 has at its axial end furthest from the wheel 14 for fixing the piston 2 by welding, and on the other hand to a ring interposed between the internal periphery of the annulus 15 and the outer periphery of the tubular axial part of the aforementioned annular piece. A sealing joint is provided between the said ring and the annulus 15.

In addition the housing 12 carries centrally a nose 17, tubular in shape, forming a centring ring. This nose 17, of axial orientation, is directed towards the turbine wheel 14. It is attached by fixing to the housing 12, in this case by welding, for example by welding of the laser type, with the formation of a bead.

More precisely the nose 17 is attached centrally to the wall 28, transverse overall, which the housing 12 has at its front.

The nose 17 surrounds the front end of the hub 13 and a thrust ring 18 interposed axially between the free end of the hub 13 and the housing. This ring 18, in this case made of friction material, has, in a manner known per se, transverse channels (not visible) for establishing communication between the inside and outside of the hub 13.

For information, it should be stated that the input shaft of the gearbox is hollowed out internally so that the fluid, in this case oil, can circulate through the ring 18 in order to operate the piston 2.

This ring 18 has a retaining insert fixed to the housing, in this case by spot welding.

Figure 2:
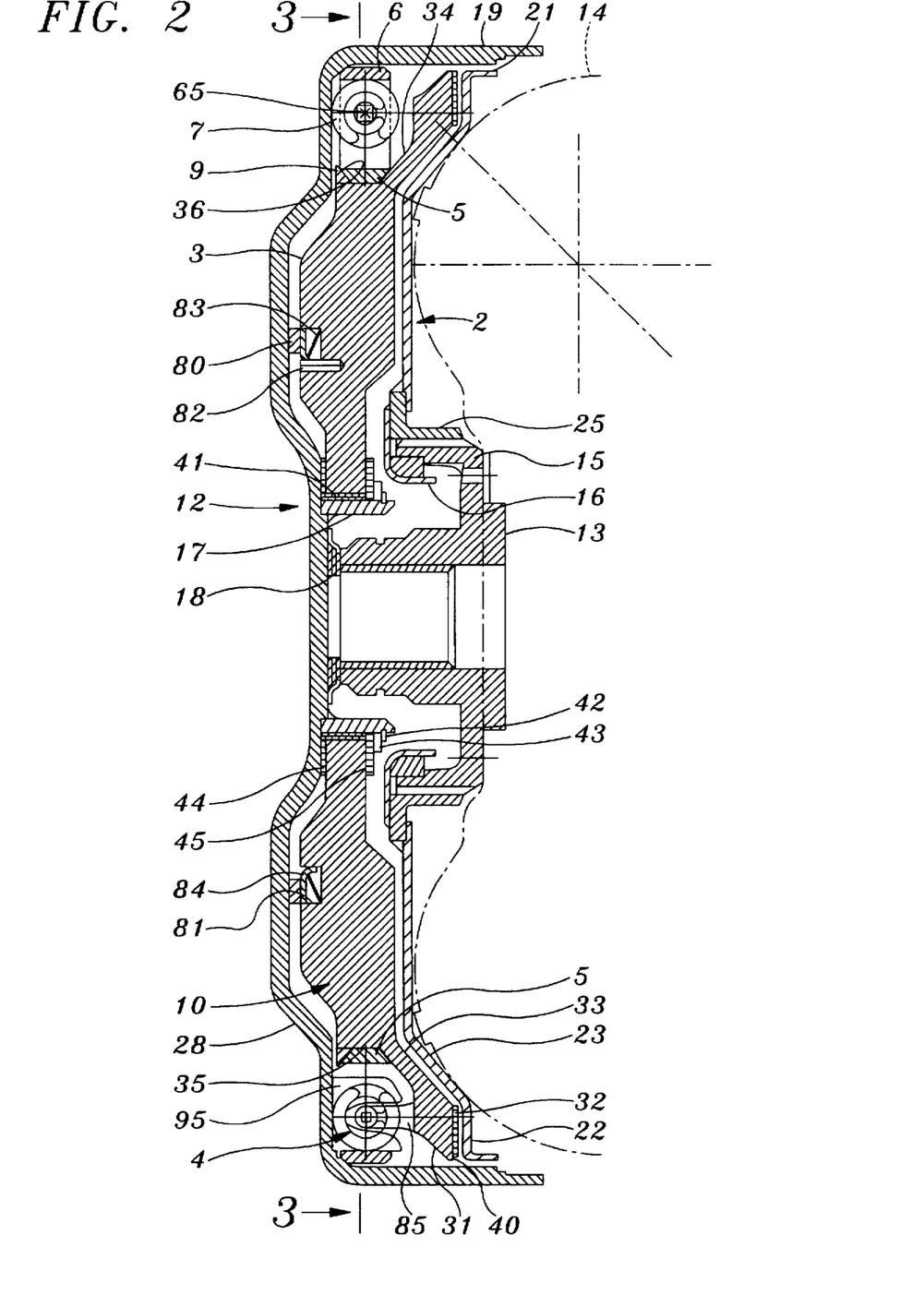
FIG. 2 is a view in axial section along the line 2—2 in FIG. 3 of the hydrokinetic device with its locking clutch.

According to one characteristic the piston 2 is interposed axially between the turbine wheel 14 and a mass 3 pivotally mounted on the nose 17.

The mass 3 carries at its outer periphery an annular projection 31 of transverse orientation offering a contact surface 32 for the piston 2 opposite a transversely oriented counter-surface 22 of the piston 2.

In this case, when the clutch 10 is engaged, the piston 2 bears indirectly through its counter-surface 22 on the surface 32, a friction lining 40 being interposed axially between the surface 32 and the piston 2. This lining 40 is in this case bonded to the surface 32, but the converse is possible, since the lining 40 can be bonded to the piston 2 provided at its outer periphery with an axially oriented annular shoulder 21 in order to stiffen it.

It is between the inner periphery of the axially oriented annular shoulder 19 which the housing 12 has at its outer periphery, and the outer periphery of the turbine wheel 14, that the surface 32 is located. To this end, the projection 31 is connected by an inclined part 33 to the main part of the mass 3 forming, according to one characteristic of the invention, the counter-piston of the clutch 10.

Likewise an inclined part connects the counter-surface 22 of the piston 2, in this case made from pressed sheet metal, to the transversely oriented main part thereof.

Thus the surface 32 and counter-surface 22 are axially offset in the direction of the turbine wheel 14, in this case by means of the inclined parts 23, 33 making it possible to fit the shape of the wheel 14 optimally and therefore to reduce the axial dimension.

According to one characteristic the inclined part 33 offers a bearing surface for a phasing washer 5 with a cross section of trapezoidal shape overall.

More precisely it is the face 34 turned in the opposite direction to the piston 2 and the wheel 14 of the inclined part 33, tapered in shape, which forms the said bearing surface. This face 34 is connected to the axially oriented annular face 35, which the main part of the mass 3 has at its outer periphery.

According to one characteristic, the mass 3 has, from place to place, radial projections 9. In this case, three projections 9 are provided. These projections 9 are wedge-shaped in cross section (FIG. 2) and offer an inclined bearing face 36 opposite the face 34.

The face 36 is inclined in the opposite direction with respect to the face 34.

According to one characteristic the projections 36 extend at the level of the free end of the face 35 so that a trapezoid-shaped groove with two inclined faces 36, 34 and a bottom 35 is formed locally.

The distance between the inclined faces 34, 36 is determined by the width of the phasing washer 5 so that the latter can be housed in the divided groove and come to bear, with assembly tolerance, on the faces 36, 34. An annular radial clearance exists between the external face 35 and the washer 5.

Thus the washer 5, referred to for convenience as the inner phasing washer, is locked axially and radially by the faces 36, 34 and the mass 3 thus forms a pulley for the washer 5.

In order to be able to mount the washer 5 in the grooves in the mass 3, according to one characteristic, the said washer 5 has locally passages 51 into which the projections 9 are able to enter. Circumferentially these projections 9 have in this case a triangular shape overall (FIG. 3) and the same applies to the passages 51 formed therefore by means of a projecting deformation 52 in the direction opposite to the axis of the assembly, the said deformation 52 being triangular in shape.

Figure 3:
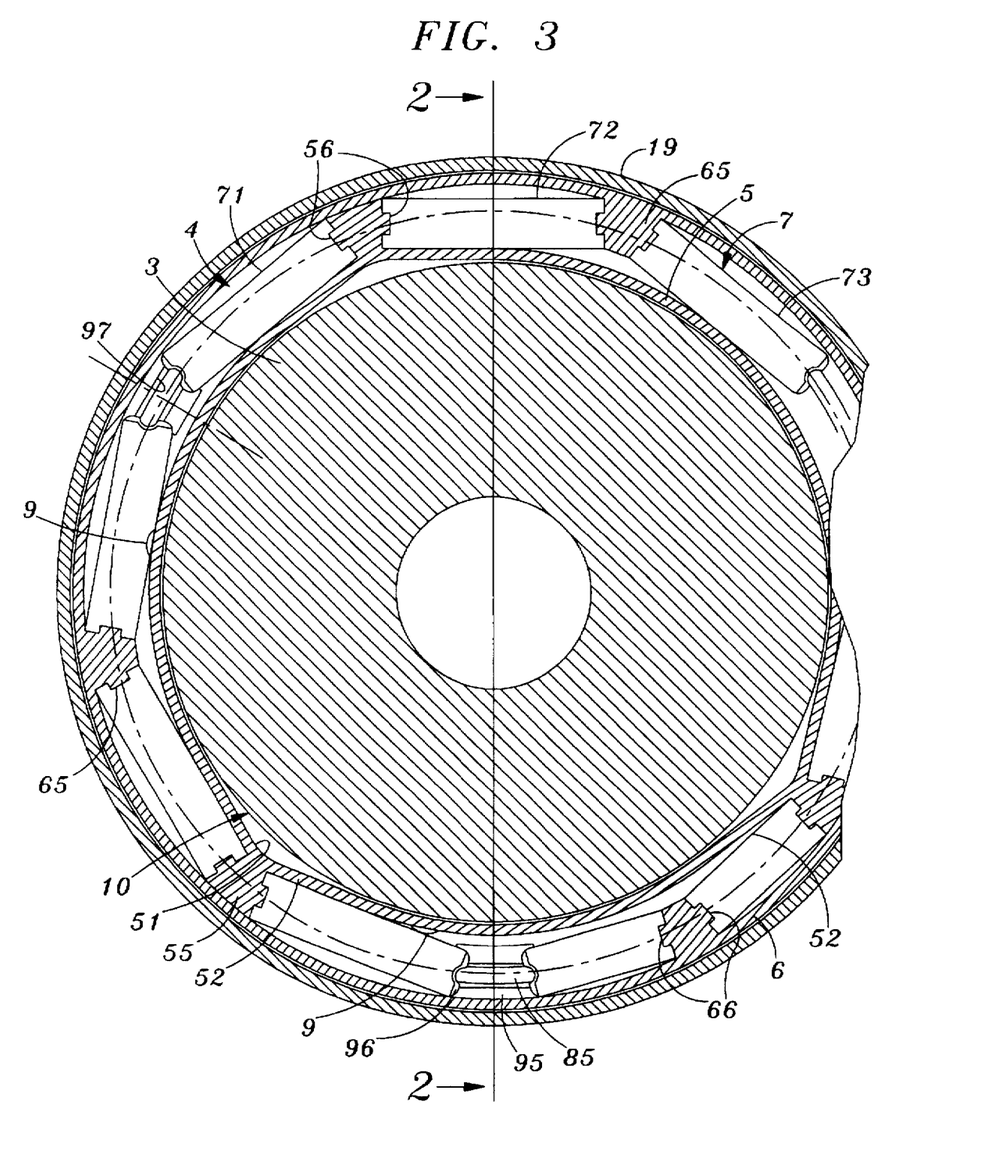
FIG. 3 is a view in cross section along the line 3—3 in FIG. 2.

Thus the mounting of the washer 5 in the grooves is of the bayonet type with, initially, axial engagement of the deformations 52 over the projections 9 and then rotation with engagement of the washer 5 in the grooves and axial locking thereof.

The mass 3 is elastically coupled to the housing 12, in this case by the torsion damping device 4 acting at the outer periphery of the mass 3. More precisely this device acts on the one hand radially between the inner periphery of the outer shoulder 19 of the housing 12 and the face 35 and, on the other hand, axially between the transverse part 28 of the housing 12, in this case made from pressed sheet metal, and the projection 31 on the mass 3, in this case made of steel or, as a variant, cast iron.

This device includes, according to the invention, another phasing washer 6, referred to as an outer phasing washer, in this case pivotally mounted on the outer periphery of the first phasing washer 5.

In this case, these washers 5, 6 are made of metal, and are produced by cutting out on a press. These phasing washers 5, 6 are mounted in reverse orientations and concentrically, the material of the inner washer 5 being taken economically from the waste material of the outer washer 6 surrounding the washer 5.

The phasing washers 5, 6 are thus mounted in the same plane.

These washers 5, 6 are in the image of each other and each have radial lugs respectively 55, 65, each with fingers respectively 56, 66 extending circumferentially on each side of the lugs 55, 65 for centring of the circumferential-action elastic means 7 described below.

The lugs 55 on the washer 5 are directed radially in the direction opposite to the axis of the assembly, whilst the lugs 65 on the washer 6 are directed towards the axis of the assembly.

These lugs 55, 65 have an overall trapezoidal shape, the free end of the lugs 65 extending at a distance from the washer 5, whilst the top edge, with a greater circumferential width, of the lugs 55 serves, according to one characteristic, for centring the outer washer 6.

This washer 6 is thus, according to one characteristic, pivotally mounted on the outer periphery of the lugs 55.

Naturally the height of the lugs 65 is such that it does not interfere with the deformations 52, and the number of lugs 55, 65 depends on the applications.

In this case three lugs 55, 65 are provided. The lugs 55 are distributed evenly at 120° with respect to each other and extend from the top of the deformations 52.

The lugs 65 are also distributed evenly at 120° with respect to each other.

The housing 12 carries from place to place bearing lugs 95, whilst the mass 3 carries fingers 85, circumferentially oblong in shape.

Three lugs 95 distributed evenly at 120° with respect to each other and three fingers 85 also distributed at 120° with respect to each other are provided.

Figure 4:
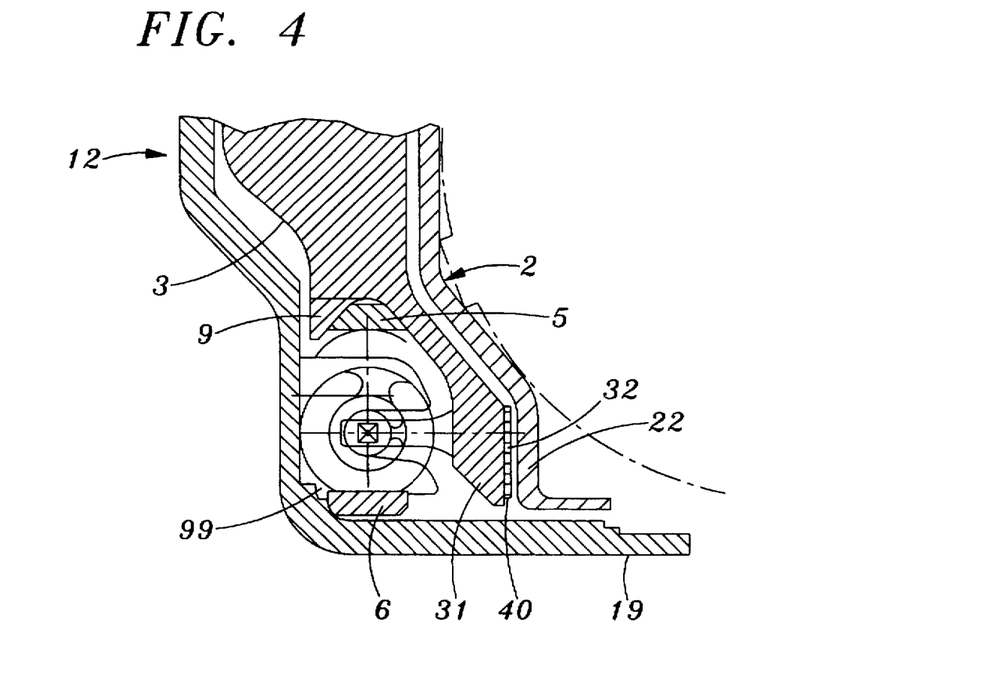
FIG. 4 is a view to an enlarged scale of the bottom part of FIG. 2.
Figure 5:
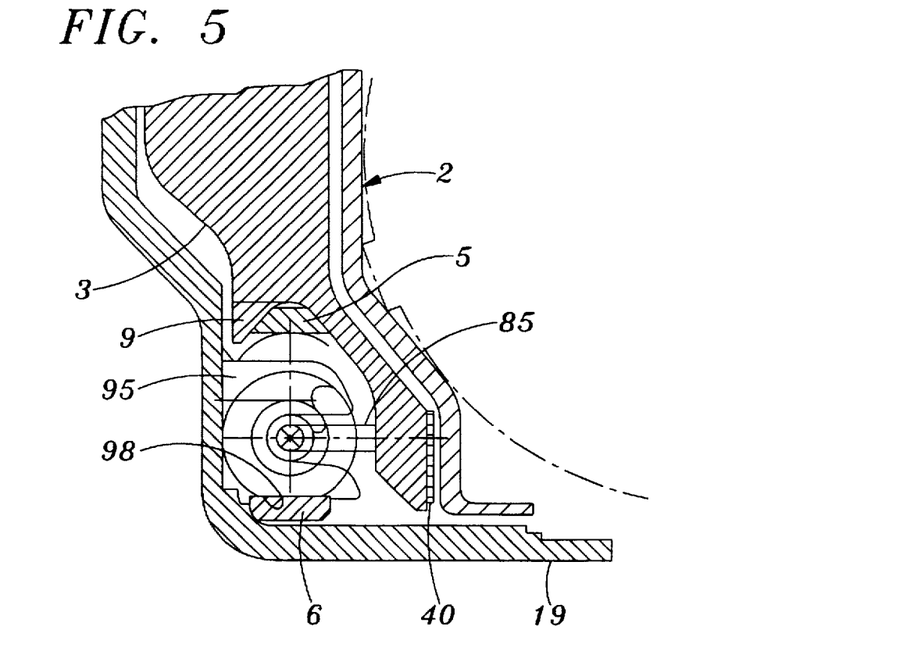
FIG. 5 is a view similar to FIG. 4, for a variant embodiment.

The fingers 85, cast in one piece with the mass 3, extend axially and the same applies to the lugs 95 attached by welding to the housing 12 (on the transverse wall 28 thereof). These lugs 95 offer transversely a large bearing surface (FIGS. 4 and 5).

In the idle state of the torsion damping device the fingers 85 enter a circumferential cutout 97 (FIGS. 4 and 6) on the bearing lugs 95.

As can be seen in FIG. 3, in the idle state of the torsion damper between two consecutive lugs 95 there are found successively a lug 65 and then a lug 55, the circumferential offset between two consecutive lugs 55, 65, 95 being 40° overall.

In this position, the projections 9 are in a median position with respect to the lugs 55, so that the washer 5 is not able to escape during the relative angular movement between the mass 3 and the washer 5.

Thus the lugs 65 on the outer washer 6 are offset circumferentially with respect to the lugs 55 on the inner washer 5, and in this case three sets of two concentric elastic members 73, 72, 71 are provided, acting circumferentially between two consecutive lugs 95, being mounted radially between the two washers 5, 6.

These elastic members belong to the aforesaid circumferential-action elastic means 7 and in this case consist of concentric helical springs of the same stiffness.

By virtue of the formation of the lugs 95 and fingers 85, it is possible thus to have three groups of three sets of elastic members acting in parallel, the three sets of elastic members acting in series between two consecutive bearing lugs 95.

Figures 6, 7:
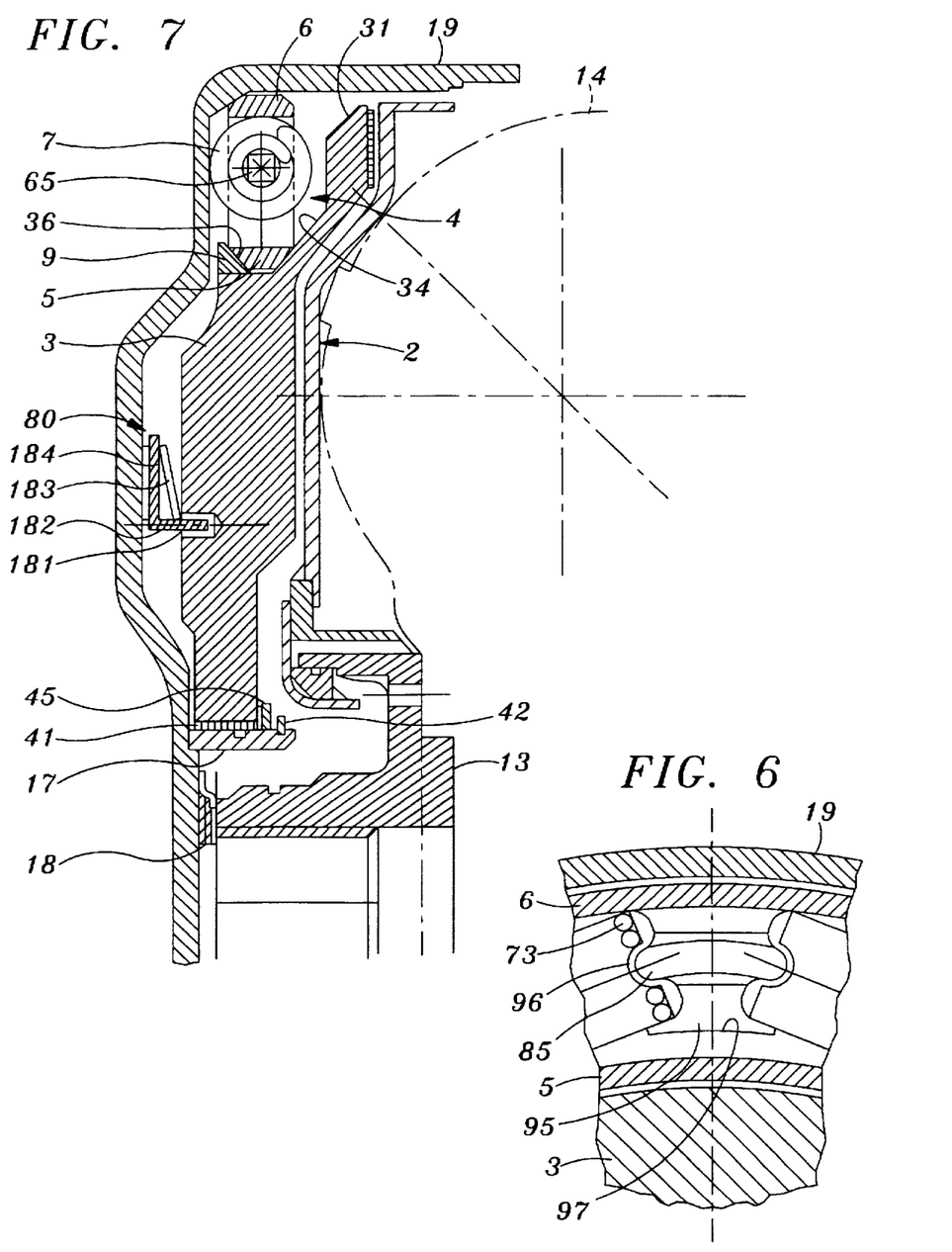
FIG. 6 is a partial view to a larger scale of part of FIG. 3.
FIG. 7 is a half-view in axial section similar to FIG. 2, for another example embodiment.

According to another characteristic, the last of the elastic members 73 bears on a support dish 96, in this case metallic (FIG. 6).

This dish 96 is curved centrally, in this case in a semi-circular fashion, in order to cooperate with one of the circumferential ends of the fingers 85, the said end being rounded for this purpose in order to enter the curved part of the dish 96.

In the idle position of the damper 4, the fingers 85 bear on the dishes 96 (FIG. 6).

Naturally a circumferential clearance may exist since, in the aforementioned idle position, the dishes 96 are in abutment on the lateral edges of the lugs 95 (FIG. 6).

The fingers 85, arched in shape (FIG. 6), are mounted telescopically inside the lugs 95 by virtue of the hollowed-out passages 97 therein.

Thus the phasing washers 5, 6 are mounted so as to rotate with respect to the two coaxial parts 12, 3, and when there is a relative movement between the mass 3 and the housing 12, the fingers 85 are allowed to act on the dishes 96 in question and to compress the elastic members 73, which bear on the lugs 65 which then move, causing a compression of the members 72 bearing on the lugs 55 which move in order to compress the springs 71 bearing on the lugs 95.

By virtue of this arrangement, it is possible to obtain large angular movements between the fingers 85 and the lugs 95. In this case, all the members 71, 72, 73 have the same stiffness but this is not necessarily the case, for example the members 72 may have a greater stiffness than the members 73, which may have a greater stiffness than the members 71, chosen for example to filter the vibrations in the idling range of the vehicle engine.

It is possible thus to obtain a torsion damping device with multiple gradients and variable stiffness.

Naturally this depends on the applications and notably on the torque to be transmitted.

It will be noted that the inner periphery of the lugs 95 is profiled so as to hold the dishes 96 (FIG. 6). Thus the inner edge of the lugs 95 is broadened.

It will also be noted (FIG. 5) that the outer washer 6 is locked axially by means of a rectangular cut-out 98, which the welded lugs 95 have at their outer periphery 80.

In FIG. 4 the washer 6 is locked axially in a single direction by means of a shoulder 99.

In some cases, the elastic means 7 effect such a locking by themselves alone because the lugs 65 come into engagement, through their fingers 66, with the springs 72, 73, themselves in engagement with the lugs 95 and 55.

In FIG. 2, the mass 3 is pivotally mounted on the tubular nose 17 fixed to the housing 12 by means of a plain bearing 41.

It will be noted that a sealing joint is provided between the inner periphery of the mass 3 and the outer periphery of the bearing 41 in this case fixed to the nose 17.

A friction washer 44 is interposed axially between the wall 28 of the housing 12 and the mass 3, whilst a friction washer 45 acts on the other face of the mass 3.

This washer is held by an application washer 43 locked axially by a circlip 42 mounted in a groove, which the nose 17 has at its free end.

According to another characteristic a variable hysteresis device 80 acts between the front wall 28 of the housing 12 and the mass 3.

This device includes an axially acting elastic washer 83 of the Belleville washer type (or a crinkle washer as a variant) and an application washer 84 bearing on its face directed towards the wall 28 a friction lining in this case fixed by bonding to the washer 84.

Naturally the friction washer can be bonded against the wall 28.

The washers 83, 84 are mounted in a hollow 81 which the mass 3 has for this purpose.

As can be seen in FIG. 2, the washer 83 bears between the bottom of the hollow 81 to act on the washer 84 and force the said washer 84 in the direction of the face 28 in order to grip the friction lining of the washer 84 in contact with the wall 28.

Thus the mass 3 is pivotally mounted at its inner periphery on the housing 12 by means of an annular bearing 41, 44, 45 in a U shape overall.

The piston 2 delimits, in a manner known per se, two chambers.

When the vehicle starts up, the piston 2 is at a distance from the face 32 and mass 3. A hydraulic pressure is then established in the chamber delimited by the piston 2, mass 3 and hub 13.

This chamber is then fed from transverse channels in the ring 18.

The locking clutch 10 is then disengaged and the impeller wheel can then drive the turbine wheel 14 and hub 13 by means of the circulation of the fluid contained in the housing 12.

In order to avoid slip phenomena and energy losses, once the turbine wheel 14 is being driven, the hydraulic pressures in the two control chambers delimited by the piston 2 are reversed.

The piston 2 is then allowed to move up to the lining 40 and then clamp the said lining 40.

During this phase, the elastic washer of the hysteresis device 80 is relieved.

It will be noted that here the application washer 84 is locked with respect to rotation by means of a pin 82 located at the level of the hollow 81.

Naturally a circumferential clearance can be provided, the washer 84 acting in a deferred manner.

To this end, the washer 84 bears at its inner periphery at least one axially oriented lug able to come into engagement with the pin 82.

Naturally, as a variant (FIG. 7), the mass 3 can have at least one cut-out 181 in the form of a mortice for the entry, optionally with circumferential clearance, of a lug 182 in the form of a tenon which the application washer 184 has at its inner periphery.

The Belleville washer 183 is then interposed axially between the mass 3 and the application washer 184, being centred by the lug 182.

It will be noted that, in this figure, the washers 44 and 43 have been omitted and that the mass 3 is able to move axially.

By virtue of all these arrangements, a locking clutch is obtained having, at the level of the hub 13, a very low inertia, principally that of the piston, when it is in the disengaged position, and with a high inertia, due to a great extent to the heavy mass 3, when it is engaged (with the lining 40 gripped between the surface 32 and countersurface 22).

This high inertia makes it possible to reduce the resonant frequency of the kinematic chain extending from the vehicle engine to the gearbox via the apparatus 11.

This resonant frequency is thus very low. Thus, when the vehicle is travelling, this resonant frequency is significantly exceeded, which is favourable for the comfort of the user.

It will be noted that, when the piston 2 is engaged, in a first phase, the friction due to the hysteresis 80 is great and then diminishes as the lining 40, optionally segmented, is gripped, the hydraulic pressure acting against the force developed by the elastic washer 83, 183. When the clutch is disengaged the friction forces increase.

Thus, when the vehicle starts off, when passing through the resonant frequency, there is a high level of friction between the housing 12 and washer 84 (the mass 3 then moving with respect to the housing 12) in order better to damp the vibrations, and then this friction diminishes.

It will be noted that the torsion damper 4 also makes it possible to attenuate vibrations, and that the embodiment in FIG. 7 is preferable since the mass 3 is able to move axially.

Naturally it is possible to remove the washer 44 in FIG. 2. In all cases the circlip 42 limits the axial movement of the mass 3 in order to prevent notably a licking of the lining 40 when the clutch 10 is disengaged.

Because of this possibility of movement, in normal running (with clutch 10 engaged), low friction is obtained between the wall 28 of the housing 12 and the mass 3 since the washer 83, 183 is relieved. The hysteresis device 80 is thus variable.

As will have been understood, the input part of the locking clutch is in two coaxial parts, namely the mass 3 and the housing 12, and the torsion damper 4 has two coaxial parts 12, 3 mounted so as to be able to move angularly with respect to each other within the limits of a given angular movement.

A very high level of comfort is thus obtained for the user.

Of course, the present invention is not limited to the example embodiment described. In particular, the mass 3 can be pivotally mounted on the nose 17 by means of a ball bearing with one or more rows of balls.

The springs 71, 72, 73 may have only one spring.

As a variant, the hydrokinetic coupling apparatus 11 may include a coupling which has no reactor wheel.

In all cases the housing 12 constitutes here the driving element of the hydrokinetic apparatus and also the input element of the torsion damping device, the mass 3 constituting the output part of the said torsion damper.

The piston 2 constitutes the output element of the locking clutch locked with respect to rotation with axial mobility on the driven element of the hydrokinetic coupling apparatus.

As a variant the piston 3 can be pivotally mounted on the hub 13 whilst being coupled directly to the turbine wheel 14 by tangential tongues.

The hub 13 then has no fluting at its outer periphery.

It will also be appreciated that the response time for engaging and disengaging the clutch 10 are very short because of the low inertia of the piston 2 and because the gear wheels in the gearbox are lightly stressed when the clutch 10 is released because of the low inertia of the piston 2.

Naturally the washer 6 can be centred by the lugs 95.

As will have been understood, and as emerges clearly from the description, the inner phasing washer 5 is pivotally mounted freely with respect to the mass 3, while the second phasing washer is pivotally mounted freely either with respect to the lugs 55 of the washer 5 and therefore to the mass 3 or to the lugs 95 belonging to the second part of the torsion damper, the mass 3 constituting the first part of the torsion damper.

Of course, the torsion damper can belong to a torsion damping device as described in the document U.S. Pat. No. 4,139,995.

In this case, the mass 3 is replaced by a hub fluted on the inside in order to be locked with respect to rotation in relation to a driven shaft.

This hub is then tubular in shape, so that the inner phasing washer is pivotally mounted freely on the outer periphery of the hub.

On the outer periphery of the hub it is possible to form grooves with inclined faces 34, 36, as described previously.

The outer phasing washer is then pivotally mounted freely either with respect to the lugs of the inner phasing washer or the spacing washer provided between the two parts of the housing forming the first part of the torsion damper, the said housing carrying a friction disc whose friction linings are suitable for being clamped between the pressure and reaction plates of a clutch.

As a variant, as described in FIG. 12 of the document U.S. Pat. No. 4,139,995, the housing can be fixed rigidly to the reaction plate.

As a variant, the torsion damping device can consist of a double damping flywheel with a plate fixed to the crankshaft and the mass 3 pivotally mounted on the nose 17 of the plate. The mass 3 then forms the reaction plate of a friction disc clutch.

Of course, in any case, dishes 96 can be provided at each circumferential end of the springs 71, 72, 73.

As a variant, the structures can be reversed. Thus the inner phasing washer 5 can have at its inner periphery lugs directed radially towards the axis of the assembly and the mass 3 the passages.

For example the mass 3 has a complementary groove hollowed in its face 33. This groove is interrupted locally (the front edge of this directed towards the housing 12) for passage of the inner lugs of the washer 5. These lugs then advantageously have in cross section a shape complementary to that of the groove in order to be engaged therein.

Thus the washer 5 can have, for example, three inner lugs evenly distributed circumferentially and the mass 3 three corresponding cut-outs. The lugs are then engaged axially in the cut-outs, and then a rotation and therefore a mounting of the bayonet type is effected.

Thus the centring washer 5 has projections from place to place, whilst the mass 3 has locally passages into which the projections are able to enter, so that the mounting of the inner washer on the mass 3 is of the bayonet type. The groove being for example trapezoidal in shape, as in the previous figures, the first coaxial part (the mass 3) therefore has at its outer periphery a first bearing face opposite another bearing face cut out for the lugs of the inner washer to pass, so that a groove, in this case trapezoidal, is formed for the housing of the inner washer, locked axially and radially by its inner lugs, trapezoidal in cross section, complementary to that of the groove.

Naturally the groove can be rectangular in cross section, just like the complementary lugs.

We claim:

1. A torsion damping device comprising: a first and second coaxial part (12, 3) mounted so as to move angularly with respect to each other counter to elastic means (7) with circumferential action, said elastic means including elastic members (71, 72, 73) acting between radial lugs (55, 65) which are offset circumferentially and belonging to two phasing washers (5, 6), said phasing washers being mounted so as to rotate with respect to the first and second coaxial parts (12, 3), wherein said two phasing washers (5, 6) are mounted in the same plane, in reverse orientations and concentrically, one of the washers (6), referred to as the outer washer, surrounding the other washer (5), referred to as the inner washer, in that the lugs (55) of the inner washer (5) are directed radially in a direction opposite to an axis of the first and second coaxial parts (12, 3), while the lugs (65) of the outer washer are directed radially towards the axis of the first and second coaxial parts (12, 3) and in that the inner washer (5) is rotatably mounted on said first coaxial part (3) of the torsion damping device, while the outer washer (6) is rotatably mounted with respect to one of said first and second coaxial parts (3, 12) of the torsion damping device.

2. A torsion damping device according to claim 1, wherein the outer phasing washer (6) is rotatably mounted on the lugs (55) of the inner washer (5).

3. A torsion damping device according to claim 1, wherein the inner washer (5) is rotatably mounted on the first coaxial part (3) of the coaxial parts of the torsion damping device, while the outer washer (6) is rotatably mounted on lugs (95), said lugs being mounted to said second coaxial part (12) of the torsion damping device.

4. A torsion damping device according to claim 1, wherein said second coaxial part (12) of the coaxial parts of the torsion damping device has lugs (95) for supporting the elastic members (73), while the first coaxial part (3) of the torsion damping device has fingers (85), and the lugs (95) of the second coaxial part (12) are cut out for the passage of said fingers (85).

5. A torsion damping device according to claim 4, wherein at least some the elastic members bear on the lugs (95) of the second coaxial part (12) of the coaxial parts of the torsion damping device through support dishes (96) which have a rounded part into which one of said fingers (85) is able to enter.

6. A torsion damping device according to claim 1, wherein said first coaxial part (3) has, from place to place, radial projections (9), while the inner washer (5) has local passages (51) into which the projections (9) are able to enter, so that the mounting of the inner washer (5) on the first coaxial part (3) of the torsion damping device is of the bayonet type.

7. A torsion damping device according to claim 6, wherein the projections (9) are transversely wedge-shaped and have an inclined bearing face (36) opposite another inclined face (34) formed on said first coaxial part (3), so that there is formed locally a trapezoidal-shaped groove for housing the inner washer (5).

8. A hydrokinetic coupling apparatus having a housing; a turbine wheel (14); and a locking clutch (10) acting between the housing and said turbine wheel, wherein said coupling apparatus further comprises a torsion damping device comprising: a first and a second coaxial part (12, 3) mounted so as to move angularly with respect to each other counter to elastic means (7) with circumferential action, said elastic means including elastic members (71, 72, 73) acting between radial lugs (55, 65) which are offset circumferentially and belonging to two phasing washers (5, 6), said phasing washers being mounted so as to rotate with respect to the first and second coaxial parts (12, 3), wherein said two phasing washers (5, 6) are mounted in the same plane, in reverse orientations and concentrically, one of the washers (6), referred to as the outer washer, surrounding the other washer (5), referred to as the inner washer, in that the lugs (55) of the inner washer (5) are directed radially in a direction opposite to an axis of the first and second coaxial parts (12, 3), while the lugs (65) of the outer washer are directed radially towards the axis of the first and second coaxial parts (12, 3), and in that the inner washer (5) is rotatably mounted on said first coaxial part (3) of the torsion damping device, while the outer washer (6) is rotatably mounted with respect to one of said first and second coaxial parts (3, 12) of the torsion damping device.

9. A hydrokinetic coupling apparatus according to claim 8, wherein the first coaxial part (3) of the torsion damping device is a mass rotatably mounted on a tubular nose (17), said tubular nose being fixed to the housing (12), and said housing constituting the second coaxial part (12) of the torsion damping device.

10. A hydrokinetic coupling apparatus according to claim 9, wherein the mass has a transversely oriented annular projection (31) offering a contact surface (32) to a piston (2) of the locking clutch disposed at an outer periphery of said mass.

* * * * *